United States Patent
M'Raihi et al.

[11] Patent Number: 5,946,397
[45] Date of Patent: Aug. 31, 1999

[54] METHOD OF CRYPTOGRAPHY WITH PUBLIC KEY BASED ON THE DISCRETE LOGARITHM

[75] Inventors: David M'Raihi; David Naccache; Jacques Stern; Serge Vaudenay, all of Paris, France

[73] Assignee: Gemplus S.C.A., La Ciotat, France

[21] Appl. No.: 08/860,832

[22] PCT Filed: Oct. 3, 1996

[86] PCT No.: PCT/FR96/01546

§ 371 Date: Sep. 24, 1997

§ 102(e) Date: Sep. 24, 1997

[87] PCT Pub. No.: WO97/13342

PCT Pub. Date: Apr. 10, 1997

[30] Foreign Application Priority Data

Oct. 3, 1995 [FR] France ................................ 95 11622

[51] Int. Cl.$^6$ .................................................. H04L 9/00
[52] U.S. Cl. .......................................................... 380/30
[58] Field of Search ...................................... 380/21, 30

[56] References Cited

U.S. PATENT DOCUMENTS

| | | | |
|---|---|---|---|
| 5,124,117 | 6/1992 | Tatebayashi | 380/30 |
| 5,297,206 | 3/1994 | Orton | 380/30 |
| 5,313,521 | 5/1994 | Torii | 380/25 |
| 5,521,980 | 5/1996 | Brands | 380/30 |
| 5,604,805 | 2/1997 | Brands | 380/30 |
| 5,724,425 | 3/1998 | Chang et al. | 380/30 |

OTHER PUBLICATIONS

Advances in Cryptology—Europcrypt '92, "Fast Exponentiation With Precomputation", Ernest F. Brinkell et al., May 24–28, 1992, pp. 200–207.

AT&T Technical Journal, "Interactive Identification and Digital Signatures", Ernest F. Brickell et al., Nov.–Dec. 1991, vol. 70, No. 6, pp. 73–86.

Journal of Cryptology, 1991, "Efficient Signature Generation by Smart Cards", C.P. Schnorr, vol. 4, No. 3, pp. 161–174.

*Primary Examiner*—Salvatore Cangialosi
*Attorney, Agent, or Firm*—Nilles & Nilles SC

[57] ABSTRACT

Method of public key cryptography based on the discrete logarithm that makes use of the computation of the variable $r=g^k \bmod p$ where p is a prime number called a modulus, the exponent k is a random number usually with a length of N bits and g is an integer called a base, wherein an entity E carries out operations of authentication and/or of signature, including exchanges of signals with another entity in which this variable comes into play.

7 Claims, 4 Drawing Sheets

FIG_1
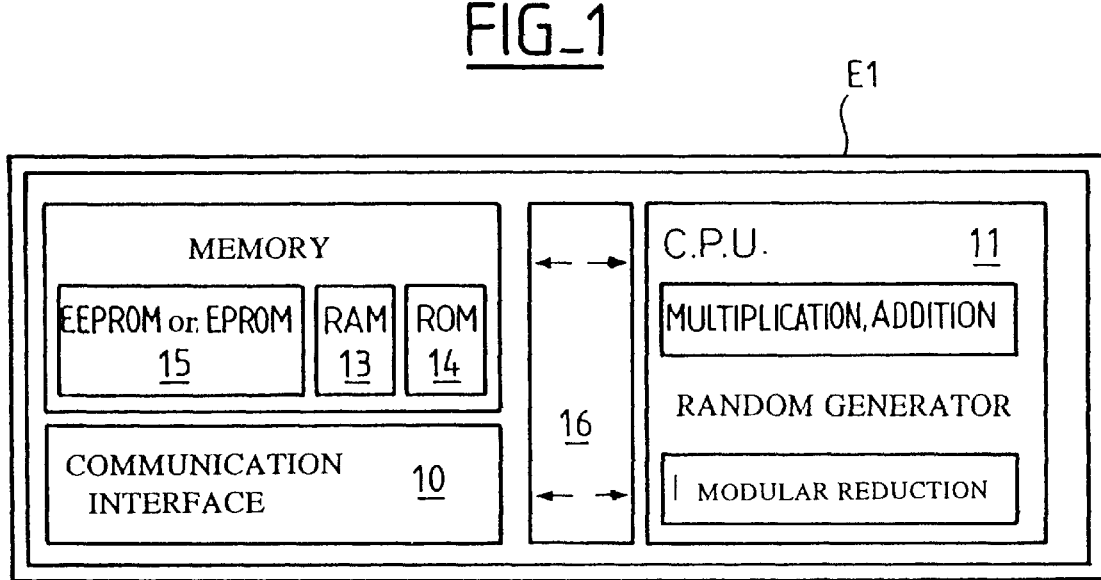
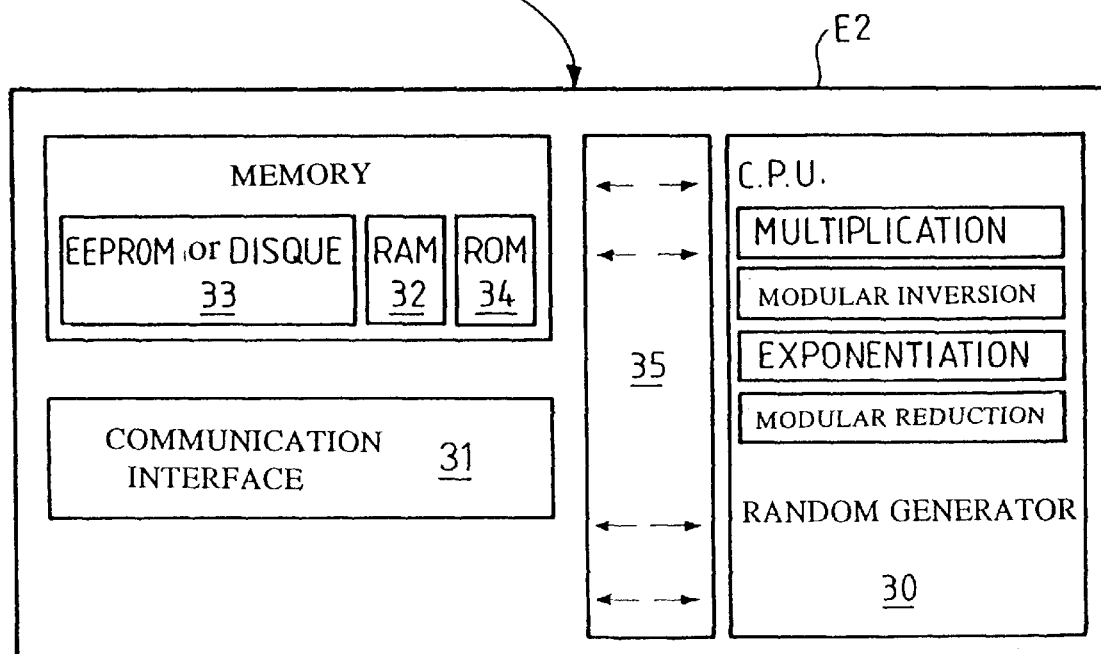

FIG_2

I — FORM A DATA BASE
$B = (k_i, g^{k_i})$
$k_i$ AS A PSEUDO-RANDOM NUMBER

II — FOR EACH EXCHANGE OF SIGNALS
- GENERATE ONE EXPONENT $k$ PER LINEAR COMBINATION OF THE $k_i$ VALUES OF THE BASE
- COMPUTE $g^k$

FIG_3

FORM A FIXED DATA BASE $B = \{(x_0, z_0) - - - (x_i, z_i) - - - (x_m, z_m)\}$
WITH $z_i = g^{x_i}$ MOD p

---

GENERATION OF AN EXPONENT k

- CARRY OUT A RANDOM LINEAR COMBINATION OF THE $x_i$ VALUES TO OBTAIN EXPONENT k SUCH AS:

$$k = \sum_{i=0}^{m} a_i x_i$$

WITH W NON-ZERO VALUES OF $a_i$

---

COMPUTE $g^k$ mod p AS A FUNCTION OF THE $(x_i, z_i)$ VALUES OF THE LINEAR COMBINATION

---

TRANSMIT SIGNAL S(k)

FIG_4

FORM AN OPEN-ENDED DATA BASE $B = \{(k_i, g^{k_i} \bmod p)\}$
$i = 1 \text{ à } n$ GENERATION OF AN EXPONENT $k_i + 1$
- CARRY OUT A LINEAR COMBINATION
OF ALL THE EXPONENTS $k_i$ COMPUTE $g^{k_i+1}$ MOD p FROM THE
$g^{k_i}$ OF THE COMBINATION

UPDATE THE BASE

TRANSMIT SIGNAL S(k)

METHOD OF CRYPTOGRAPHY WITH PUBLIC KEY BASED ON THE DISCRETE LOGARITHM

BACKGROUND OF THE INVENTION

1. Field of the Invention

An object of the present invention is a method of cryptography known as a public key method based on the discrete logarithm, making use of a variable modulo p.

It can be applied in the generation of digital signatures of messages or in a transfer of authentication between two entities.

In such procedures, security is based on the fact that it is extremely difficult to reverse certain functions and more particularly the discrete logarithm.

Given the mathematical relationship $y=g^x$ modulo p which shall hereinafter be written as $y=g^x$ modp (which means that y is the remainder of the division of $g^x$ by p), this problem consists in finding x when p, g and y are known. With the present state of knowledge, this problem is impossible to resolve once the size of p reaches 512 bits or goes beyond it and once the size of x reaches 128 bits or goes beyond it.

In such systems, there is generally an authority that gives the large-sized number p constituting the modulus. The authority also chooses an integer g, called the base, such that the set generated by g, namely the set formed by the numbers $g^x$ modp for x belonging to the interval [0, p−1] is a subset of maximum size, at least $2^{128}$.

The parameters p and g are said to be "public", that is, they are given by the authority to all the users coming under this authority.

According to certain variants, these parameters are chosen individually by each user and, in this case, form an integral part of its public key.

2. Description of the Related Art

A major drawback of the implementation of cryptographic systems lies in the need for relatively large computation and storage means owing to the complex computations that are performed.

Indeed, the computation of the variable $g^k$ modp consists of the performance of modular multiplication operations and this is costly in terms of computation time and memory space. In simple electronic devices that use only standard microprocessors, this type of operation can hardly be performed.

For electronic devices possessing a processor that is specialized for this type of commutation, it is nevertheless desirable to limit the computation time and the memory space needed for the intermediate results.

Indeed, it is in general relatively costly to compute the variable $g^k$ modp by the standard square-multiply or SQM method since it is equivalent on an average to $3/2 \log_2(p)$ multiplication operations.

According to this method, a computation is made of all the powers of g, namely when k has a length of n bits, all the squares:

$g^{2^0}, g^{2^1}, \ldots g^{2^n}$,

According to the simple "square-multiply" method, $g^k$ requires n/2 multiplication operations and n squares.

A method proposed by E. BRICKELL et al., known as the BGCW method, reduces the number of multiplication operations in the case of the square-multiply method but introduces a need for the storage of numerous precomputed constants and hence the need to have available a quantity of storage memories that is extremely disadvantageous.

OBJECTS AND SUMMARY OF THE INVENTION

It is an object of the present invention to overcome all these drawbacks. It provides for an approach, that is flexible and costs little in terms of computation time and memory space, to the implementation of cryptographic algorithms for all systems of cryptography and especially by portable machines of the microprocessor based chip card type.

According to the invention, two approaches are proposed. Both approaches are based on a common principle in which a data base of random values is formed and these values are combined to determine exponents k used for the exchanges between two entities.

With the two approaches proposed, the computation of an exponent k requires fewer than 30 modular multiplication operations for a memory space that is quite acceptable for carriers such as chip cards.

An object of the invention more particularly is a method of public key cryptography based on the discrete logarithm that makes use of the computation of the variable $r=g^k$ modp where p is a prime number called a modulus, the exponent k is a random number usually with a length of N bits and g is an integer called a base, wherein an entity E carries out operations of authentication and/or of signature, comprising exchanges of signals with another entity in which this variable comes into play, characterized in that this method comprises the following steps for a given entity:

forming a data base containing a fixed number of exponents and the corresponding powers, then for each exchange of signals:

generating an exponent by carrying out a random linear combination of the exponent values of the base, and computing the power of g on the basis of the powers of the base entering the combination.

According to a first embodiment, the steps consist in:

forming a fixed data base containing m random values $x_i$ and the corresponding variables $z_i$ such that $z_i = g^{x_i}$ modp, generating an exponent k necessary for each signature by carrying out a random linear combination of the values $x_i$ of the base, computing the variable $g^k$ modp on the basis of the variables $z_i$ pertaining to the values $x_i$ that come into play in the combination, using this variable in the exchanges of signals with another entity.

According to a second embodiment, the steps consist in:

forming an open-ended data base containing n random values of exponents and their power ($k_i$, $g^{k_i}$ modp), generating a new exponent $k_{i+1}$ necessary for a signature by carrying out a random linear combination of the n values $k_i$, computing the variable $g^{k_{i+1}}$ modp by obtaining the product of the powers of $g^k$ of the linear combination, updating the base of the exponents and the power values, using this variable in the exchanges of signals with another entity.

BRIEF DESCRIPTION OF THE DRAWINGS

Other features and advantages of the invention shall appear from the following description, given by way of a non-restrictive example with reference to the appended drawings of which:

FIG. 1 is a drawing showing the principle of a system capable of implementing the invention, FIG. 2 is a functional drawing showing the essential steps of the method according to the invention, FIG. 3 is the functional drawing of a first embodiment, FIG. 4 is the functional diagram of a second embodiment.

DESCRIPTION OF THE PREFERRED EMBODIMENTS

FIG. 1 is a drawing showing the principle of a system for the implementation of the cryptographic method that is an object of the invention.

This system is formed by an entity E1 seeking to carry out exchanges of electronic signals with at least one other entity E2. The two entities are provided respectively with a processing unit (CPU) 11, 30, a communications interface, a random-access memory (RAM) 13, 32 and/or a non-programmable read-only memory (ROM) 14, 34 and/or a programmable or reprogrammable non-volatile memory (EPROM or EEPROM) 15, 33 and an address, data and control bus 16, 35.

The processing control unit and/or the ROM contain computation programs or resources corresponding to the performance of the computation steps that come into play in the method according to the invention, namely during a session of authentication or during the generation of an electronic signature in the course of which the two entities exchange electronic signals.

The processing unit or the ROM possesses the resources needed for operations of modular multiplication, addition and reduction.

This is so in the same way as the processing unit and/or the ROM comprise the cryptography functions used proper to each cryptography algorithm and the parameters g and p that are needed for the computation and are fixed once and for all for the remainder of the operation. The exponents $x_i$ according to the first embodiment or $k_i$ according to the second embodiment could be loaded beforehand into a reprogrammable memory by the authority or generated by means of a random generator and a secret source value $x_0$ (or $k_0$) that is random. Each entity E1, E2 furthermore has a secret key x and the public key y.

The invention can be applied especially to cryptography systems set up in banking where high security is needed during transactions carried out on accounts.

This is also the case when it is sought to authenticate the dispatch of messages transmitted in the form of electronic signals sent by another entity.

It is also the case when there is need to sign messages during exchanges of signals with another entity.

In practice, the entity seeking to make a transaction could be, for example, an integrated circuit card such as a chip card and the addressee entity will then be a bank terminal.

The rest of the description shall be made in the context of the application of the method to the signing of digital messages, it being understood that the invention can be applied to any system of cryptography based on the discrete logarithm.

FIG. 1 illustrates the essential steps of the method. According to the invention, a data base is formed containing a fixed number of exponents and the corresponding power values, and then for each exchange of signals:

an exponent is generated by carrying out a random linear combination of the exponent values of the base, and the power of g is computed from the powers of the base that go into the combination.

The method according to the invention proposes two approaches both relying on the formation (or constitution) of this data base.

According to the first embodiment, the base is fixed and formed by a set of m pairs $(x_i, z_i)$. The data elements $x_i$ are random numbers obtained as stated here above by a generator of random or pseudo-random numbers. The length of these numbers is that of an exponent k and is the same for all (namely N bits). The variables $z_i$ are the result of a prior computation such that:

$z_i = g^{x_i}$ modp.

The length of the variables $z_i$ is that of the modulo p.

When the entity E1 possesses this data base $B = [(x_0, z_0), \ldots (x_{m-1}, z_{m-1})]$, it can exchange signals with another entity in making use, for example, of a DSA signature (r, s) such that $r = g^k$ modp in which k has been generated from the data elements of the base B.

Thus, according to the invention, the entity generates an exponent k when it is necessary and it does so in achieving a random linear combination of the values $x_i$ of the base. The entity then computes the corresponding variable $g^k$ modp.

To generate the exponent k, the entity proceeds as follows:

the entity generates a sequence of values $a_i$: $(a_0, \ldots, a_{m-1})$ which are random integers such that $0 \leq a_i \leq h$ and among which w values only are non-zero, the entity generates k so that:

$$k = \sum_{i=0}^{m-1} a_i x_i$$

the entity then computes the variable $g^k$ modp by carrying out multiplication operations of powers of g given by the values $z_i$ relative to $x_i$ which enter the linear combination. In practice, the values of $x_i$ that enter the linear combination are those for which the coefficient $a_i$ is not zero.

The algorithm of BRICKELL et al. is used to perform this computation, but the number of multiplication operations is henceforth $(h/h+1)$ w+h−2 instead of $(h/h+1)m+h-2.$ The number w is fixed with respect to the required security and leads to the following results for the values of m and h:

m=32, w=24 and h=8 m=64, w=20 and h=6

These values are given by way of examples and it is possible to envisage various combinations provided that the safety constraints are met.

Should m=64 and w=20, the number of multiplication operations needed according to the invention is 34 whereas with the method such as that of BRICKELL there would be 60 multiplication operations to be performed.

For m=32, there are therefore stored 32 numbers with a size of modulo p giving 512 to 1024 bits as the case may be and 32 numbers of 160 bits (N=160).

The m pairs $(x_i, z_i)$ will be stored in an EEPROM memory if the entity should be a card, and this will be done in a protected manner by the usual methods of screening and the like.

The second approach proposed according to the invention consists of the formation of an open-ended data base from n random values of exponents $k_i$, i=1 to n and their power $g^{ki}$ modp.

A first new value of exponent $k_{i+1}$ is then obtained by random linear combination of the exponents of the base. The variable $g^{k_i+1}$ corresponding to this new exponent is computed. This new pair is introduced into the data base as a replacement for the first one.

An exponent k necessary for a signature is obtained by the linear combination of all the other exponents of the base and the contents of the base are modified at each new generation of an exponent.

Indeed, the base is updated by replacing the first pair by the last one obtained.

Thus, at the instant t, the base has the form:

$((k_o, g^{k}o\ modp), (k_1, g^{k}1\ modp), \ldots,) (k_t, g^{k}t\ modp))$ then $k_{t+1}$ is computed and the base is updated and becomes:

$((k_1, g^{k}1\ modp), (k_2, g^{k}2\ modp), \ldots,) (k_t, g^{k}t\ modp), (k_{t+1}, g^{k}t+1\ modp))$ The process is repeated at each computation of a new value of k in the pseudo-random sequence.

Each exponent of the base is a linear combination expressed for the following relationship:

$$k_t = \sum_{i=0}^{h-1} a_i k_{t+i-(h-1)};$$

with h−1=n
wherein the coefficients $a_i$ are random positive integers.

The random numbers are obtained by means of a fixed sequence $a_0, \ldots, a_{h-1}$ on which a random permutation is done.

Thus, the generation of an exponent $k_{t+1}$ can be expressed by the following relationship:

$k_{t+1} = l_t[k_{(t+i-(h-1))}, \ldots, k_t]$ $l_t$ being a linear functional with integer coefficients chosen at random from among L functionals.

The coefficients $a_i$ are small powers of 2. Values taken between 1 and $2^f$ are chosen, with f having a size that enables efficient implementation. It will be chosen for example to have f=7 in order to remain consistent with the values proposed by Schnorr's algorithm. The series $0, \ldots, a_{h-1}$ will therefore be taken as a random permutation of the sequence $(1, 2, \ldots, 2^7)$.

The coefficients of the linear combinations must be smaller than a threshold value b to prevent attacks and preserve the values of $k_t$ in a uniformly distributed and independent state (h−1).

Taking h and $L=b^h$, the values h=8 and b=4 are suggested and $L=\{1, \ldots, b\}^h$ is fixed.

The size of the numbers k is generally 160 bits. In this case, the number of modular multiplication operations that come into play according to the method of the invention is substantially smaller than the number of multiplication operations generally observed in the present state of the art. Indeed, for the values chosen, it is smaller than 30.

We claim:

1. Method of public key cryptography based on the discrete logarithm that makes use of the computation of the variable $r=g^k$ modp where p is a prime number called a modulus, the exponent k is a random number usually with a length of N bits and g is an integer called a base, wherein an entity E carries out operations of authentication and/or of signature, comprising exchanges of signals with another entity in which this variable comes into play, characterized in that this method comprises the following steps for a given entity:

forming a data base containing a fixed number of exponents and the corresponding powers, then for each exchange of signals:

generating an exponent by carrying out a random linear combination of the exponent values of the base, and computing the power of g on the basis of the powers of the base entering the combination, said steps consisting in:

forming a fixed data base containing m random values $x_i$ and the corresponding variables $z_i$ such that $z_i = g^{xi}$ modp, generating an exponent k necessary for each signature by carrying out a random linear combination of the values $x_i$ of the base, computing the variable $g^k$ modp on the basis of the variables $z^i$ pertaining to the values $x^i$ that come into play in the combination, using this variable in the exchanges of signals with another entity, said method being characterized in that the generation of the variables k comprises the following other steps:

generating an exponent k such that $k = \Sigma a_i x_i$ and such that w of the m values $a_i$ are non-zero, the choice of the $a_i$ non-zero values being obtained randomly, computing the variable $g^k$ modp in using the values $z_i$ corresponding to the values $x_i$ that enter the linear combination of k.

2. Method of public key cryptography according to claim 1, characterized in that, to form the data base in an entity, the following steps are performed:

generating m random values $x_i$ of N bits using a pseudo-random generator and a secret initial value $x_0$, computing the variable $z_i = g^{xi}$ modp by taking the product of the powers of g modulo p entering the linear combination according to which a value $x_i$ may be broken down, storing the m pairs $(x_i, z_i)$. in a non-volatile memory of the entity.

3. Method of public key cryptography according to claim 1, characterized in that the steps consist in:

forming an open-ended data base containing n random values of exponents and their power $(k_i, g^{k}i\ modp)$, generating a new exponent $k_{i+1}$ necessary for a signature by carrying out a random linear combination of the n values $k_i$ of the base, computing the variable $g^{k}i+1$ modp by obtaining the product of the powers of g entering the linear combination, updating the base by replacing the pair with this new pair, using this variable in the exchanges of signals with another entity.

4. Method of cryptography according to claim 3, characterized in that, for an exponent $k_t$ of the base, this exponent is a linear combination with the form:

$$k_t = \sum_{i=0}^{h-1} a_i k_{t+i-(h-1)};$$

with h−1=n
and in which the coefficients $a_i$ are random positive integers.

5. Method of cryptography according to claim 3, characterized in that the coefficients $a_i$, i=0 to h−1 are obtained by a random permutation of a fixed sequence.

6. Method of cryptography according to claim 5, characterized in that a new exponent $k_{t+1}$ is a linear combination of the other exponents expressed by the relationship:

$$k_{t+1}=l_t(k_{t+i-(h-1)}, \ldots, k_t),$$

and $l_t$ is a linear functional.

7. Method of cryptography according to claim 1, characterized in that it can be implemented for microprocessor cards.

* * * * *